UNITED STATES PATENT OFFICE.

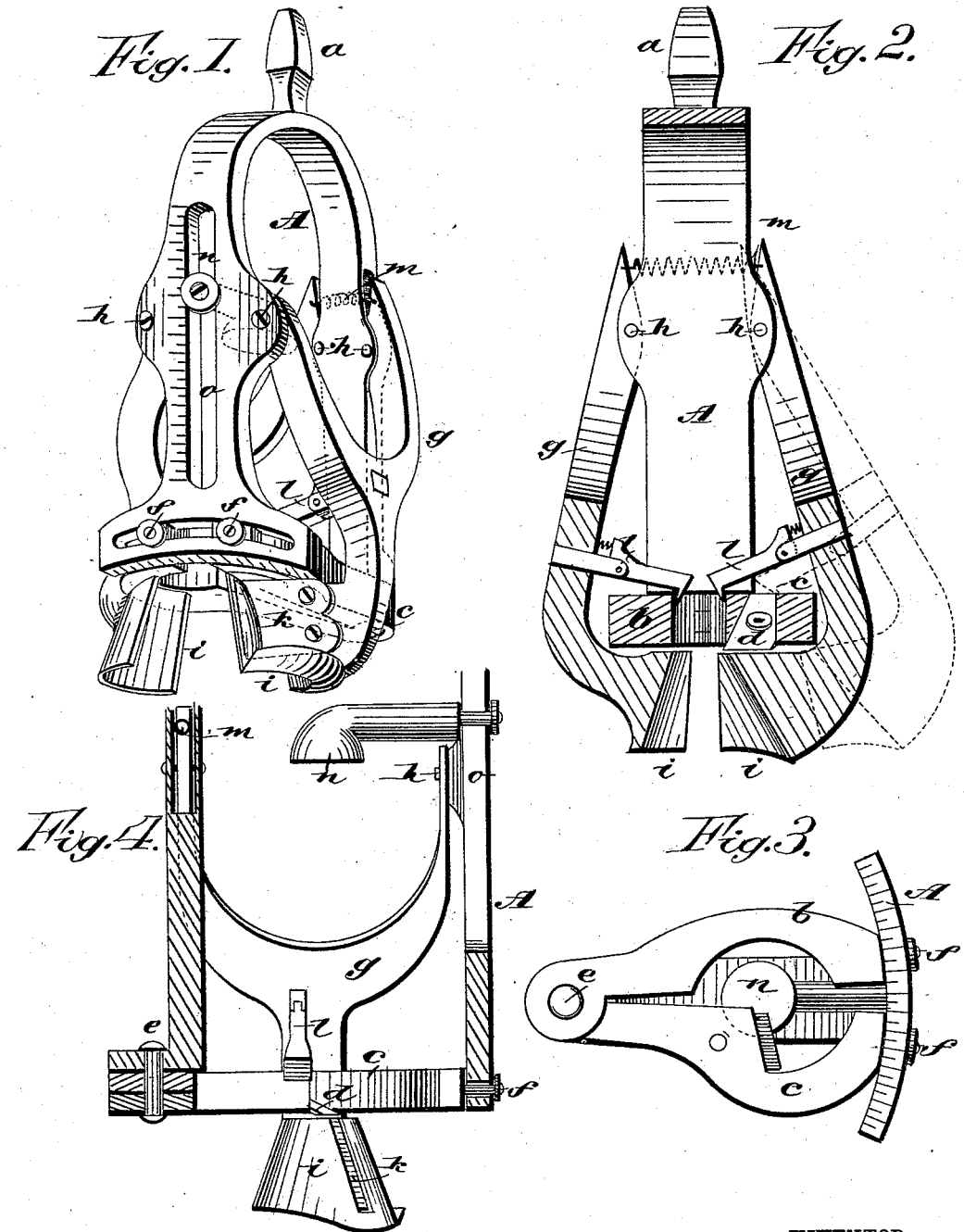

JAMES A. RODMAN, OF LEBANON, TEXAS.

HOLLOW AUGER.

SPECIFICATION forming part of Letters Patent No. 283,981, dated October 16, 1883.

Application filed February 9, 1883. (Model.)

*To all whom it may concern:*

Be it known that I, JAMES A. RODMAN, of Lebanon, in the county of Collin and State of Texas, have invented a new and Improved Hollow Auger, of which the following is a full, clear, and exact description.

In the work of forming tenons on the ends of wheel-spokes, and in similar work—such, for instance, as fitting ferrules on single-trees, &c.—the spoke or other article is first pointed down with a knife or fore-auger, as the hollow augers will not take hold upon the blunt end of the spoke. This requires extra time and labor, which it is the object of my invention to avoid.

My invention consists in an adjustable hollow auger and an adjustable fore-auger, which are combined together for use with an ordinary brace, and constructed in such a manner that when applied to use the end of the spoke or other article is first beveled by the fore-auger, and the tenon then formed by the hollow auger. The cutters of the fore-auger are formed upon pivoted arms, which are automatically released, and then thrown open by a spring when the spoke is pointed, in order to give opportunity for the hollow auger to act, all as hereinafter described and claimed.

Reference is to be had to the accompanying drawings, forming part of this specification, in which similar letters of reference indicate corresponding parts in all the figures.

Figure 1 is a perspective view of my improved auger. Fig. 2 is a longitudinal section of the same. Fig. 3 is a bottom view of the hollow auger, and Fig. 4 is a section at right angles to Fig. 2.

A is the head or yoke, made in one piece, of inverted U form, and provided with a shank, *a*, for being clamped in place. At the lower and open end of the head A are the jaws *b c*, forming the hollow auger *b*, being what is termed the "off jaw," and *c* the jaw carrying the knife or cutter *d*. The two jaws *b c* are attached at one end by a pivot-pin or screw, *e*, so that they may be separated more or less, according to the size of tenon that is to be cut. Their outer or moving ends are attached to the opposite leg of the head A by a clamping-screw, *f*, which passes through a slot in the leg, so that the jaws may be clamped firmly, and, as shown in Fig. 3, a graduated scale is provided for guiding the adjustment. *g g* are two arms having forked ends that are pivoted at *h* to the head A, and are formed at their lower end with the flaring jaws *i i* of the fore-auger, one of which is fitted with a cutter, *k*. The jaws *i i* come beneath the jaws of the hollow auger when the arms *g g* are brought together, and in this position they are held by latches or triggers *l l*, the ends of which catch upon the jaws *b c*. A spring, *m*, connected to the upper end of the arms *g g*, serves to spread the arms open when they are released. Within the head A, and attached to one side thereof by a screw passing through a slot, *o*, in the side of the head, is a gage or stop, *n*, which, being adjustable in the slot *o*, regulates the depth to which the spoke enters the tool, and consequently the length of the tenon.

In using the tool the jaws *b c* are adjusted according to the diameter of the tenon that is to be cut, the stop *n* is adjusted, and the arms *g* then brought together and the triggers *l* caught. The tool is then applied to the end of the spoke, and the fore-auger acts first to bevel or point the end. As soon as the pointed end reaches the triggers *l* they are raised, and the arms *g* being thereby released, they spring outward, leaving the hollow auger free to act upon the spoke, and the continued revolution of the auger causes the cutting of the tenon until the spoke reaches the stop *n*.

With this tool the work of forming round tenons can be performed at a great saving of time and labor.

It will be understood that I do not confine myself to the exact form and details of the parts as shown, as the same may be varied within the scope of my invention.

Having thus described my invention, I claim as new and desire to secure by Letters Patent—

1. In a tenoning-tool, the combination of a hollow auger and a beveling or tapering auger, the latter having means capable of engagement with and disengagement from the former, whereby the spoke is successively pointed or beveled and tenoned, substantially as described.

2. In a tenoning-tool, the combination of the hollow auger and the beveling or tapering auger, the latter arranged below the hollow auger, and having means capable of engagement with and disengagement from said hollow auger, substantially as and for the purpose set forth.

3. In a tenoning-tool, the combination, with the hollow auger, of the beveling or tapering auger having pivoted arms provided with beveled jaws, one of the latter having a cutter, and arranged below the hollow auger, said arms having means to effect the holding of the same, and to permit their release after the beveling or tapering of the spoke or material, substantially such as set forth.

4. The combination, with the head A, having the cutting-jaws $b$ $c$, of the arms $g$, pivoted to said head, and carrying beveled jaws $i$, one of which is provided with a clutch, $k$, and spring-triggers connected to said pivoted arms, substantially as and for the purpose set forth.

5. The combination of the U-shaped head A, having the adjustable jaws $b$ $c$ and the pivoted arms $g$, carrying the beveled jaws $i$, one of which has a cutter, $k$, triggers $l$, pivoted to the arms $g$, and the stop $u$, adjustable in the head A, substantially as and for the purpose set forth.

JAMES A. RODMAN.

Witnesses:
   B. S. SHELBURNE,
   J. D. CARPENTER,
   W. M. SAND.